(12) United States Patent
Wu et al.

(10) Patent No.: US 12,485,900 B1
(45) Date of Patent: Dec. 2, 2025

(54) METHOD FOR CONTROLLING VEHICLE, COMPUTING DEVICE AND NON-TRANSITORY STORAGE MEDIUM EMPLOYING METHOD

(71) Applicant: HON HAI PRECISION INDUSTRY CO., LTD., New Taipei (TW)

(72) Inventors: Kuo-Hsi Wu, New Taipei (TW); Jing-Chih Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 19/070,807

(22) Filed: Mar. 5, 2025

(30) Foreign Application Priority Data

Aug. 6, 2024 (CN) .......................... 202411071923.6

(51) Int. Cl.
*B60W 30/188* (2012.01)
*B60W 30/02* (2012.01)
*B60W 30/18* (2012.01)

(52) U.S. Cl.
CPC .......... *B60W 30/188* (2013.01); *B60W 30/02* (2013.01); *B60W 30/18172* (2013.01); *B60W 2520/14* (2013.01); *B60W 2520/26* (2013.01); *B60W 2552/40* (2020.02); *B60W 2720/14* (2013.01)

(58) Field of Classification Search
CPC .............. B60W 30/188; B60W 30/02; B60W 30/18172; B60W 2552/40; B60W 2520/14; B60W 2520/26; B60W 2720/14
See application file for complete search history.

(56) References Cited

U.S. PATENT DOCUMENTS

| | | | |
|---|---|---|---|
| 11,148,660 B2 * | 10/2021 | Suzuki | B60L 15/2072 |
| 12,162,472 B1 * | 12/2024 | Chen | B60W 40/114 |
| 2006/0142922 A1 * | 6/2006 | Ozaki | B60W 40/064 701/70 |
| 2019/0202441 A1 * | 7/2019 | Suzuki | B60W 10/119 |

* cited by examiner

*Primary Examiner* — Huan Le
(74) *Attorney, Agent, or Firm* — ScienBiziP, P.C.

(57) ABSTRACT

A vehicle control method for improving a driving stability of a vehicle includes: obtaining road information and determining a friction coefficient of road surface according to the road information; obtaining first vehicle parameters and a first yaw rate of the vehicle, the first vehicle parameters including a turning angle of steering wheel, and a longitudinal speed, and a lateral speed; determining a second yaw rate of the vehicle according to the first vehicle parameters, the first yaw rate, and the friction coefficient of road surface; determining a yaw moment of the vehicle according to a difference value between the first yaw rate and the second yaw rate; and distributing the yaw moment to a four-wheel driver, the four-wheel driver including four independent drivers for driving wheels. A computing device and a non-transitory storage medium are also provided.

17 Claims, 4 Drawing Sheets

METHOD FOR CONTROLLING VEHICLE, COMPUTING DEVICE AND NON-TRANSITORY STORAGE MEDIUM EMPLOYING METHOD

TECHNICAL FIELD

The subject matter herein generally relates to vehicle control technologies.

BACKGROUND

A four-wheel drive system can make a vehicle owning a good power performance, which can also make the vehicle have a good passability in various road conditions.

Although the current four-wheel drive system can provide a good road passability, an ability for coping with losing control and skidding of vehicle is poor. For example, when the vehicle drive on a low-friction road, the four-wheel drive system cannot cope with a problem of losing control and skidding caused by the low-friction road, and a driving safety of the vehicle is poor on such road.

BRIEF DESCRIPTION OF THE DRAWINGS

Implementations of the present disclosure will now be described, by way of embodiments, with reference to the attached figures.

DETAILED DESCRIPTION

Figure 1:
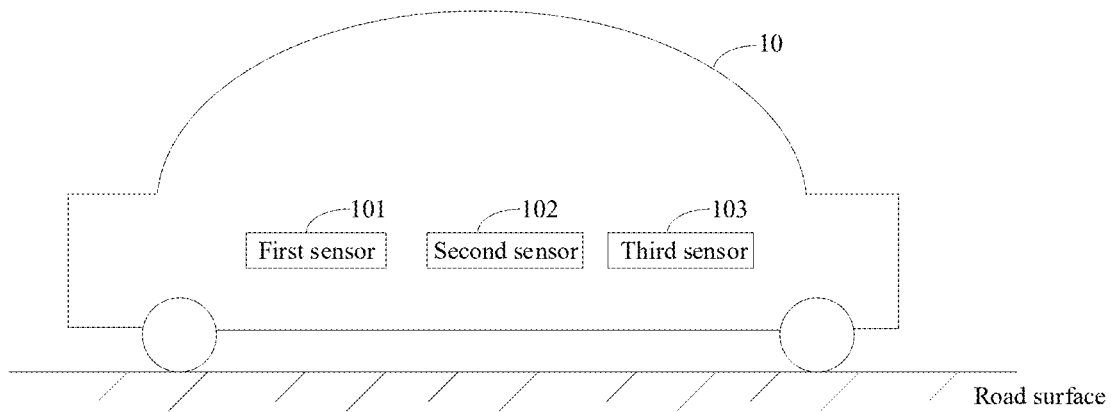
FIG. 1 is an application scenario diagram of a vehicle control method according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasable connected. The term "comprising," when utilized, means "including, but not necessarily limited to"; it specifically indicates open-ended inclusion or membership in the so-described combination, group, series, and the like.

In a vehicle related technology, a four-wheel drive system can provide a good road passability, while an ability for coping with losing control and skidding of vehicle is poor. For example, when a vehicle drive on a low-friction road, the four-wheel drive system cannot cope with a problem of losing control and skidding caused by the low-friction road, and a driving safety of the vehicle is poor on such road.

In view of this, an embodiment of the present application provides a vehicle control method for solving a problem that a four-wheel-drive vehicle has a poor ability in a losing control and skidding scenario.

FIG. 1 illustrates one exemplary embodiment of an application scenario.

The embodiment refers to a vehicle 10, the vehicle 10 can be a four-wheel-drive vehicle, i.e., the vehicle 10 owns four-wheel independent drive capabilities. Multiple types of sensors can be installed on the vehicle 10. For example, the vehicle 10 can be provided with a first sensor 101 for sensing road information. The first sensor 101 may include cameras, or cameras and lidars. The road information sensed by the first sensor 101 can be transmitted to a data processing module in the vehicle 10, and the road information is processed by the data processing module to determine a friction coefficient of road surface (also can be called as a coefficient of road adhesion). For example, the data processing module may include an electronic control unit (ECU) for data processing tasks.

In one embodiment, the vehicle 10 can also be provided with a second sensor 102 and a third sensor 103. The second sensor 102 is configured for sensing first vehicle parameters of the vehicle 10. For example, the second sensor 102 may include a steering wheel angle sensor, a vehicle speed sensor, etc., and the first vehicle parameters may include a turning angle of steering wheel, a longitudinal speed, a lateral speed, etc. The turning angle of steering wheel can be sensed by the steering wheel angle sensor, the longitudinal speed can be sensed by the vehicle speed sensor, and the lateral speed can be estimated based on preset parameters. For example, the lateral speed can be estimated based on a lateral acceleration, a yaw velocity, and the longitudinal speed of the vehicle 10. The embodiment of the present application does not limit a calculation method for estimating the lateral speed, and a current calculation method can be used to estimate the lateral speed. The turning angle of steering wheel can refer to a clockwise rotation angle or a counterclockwise rotation angle of the steering wheel relative to an initial position. The longitudinal speed can be a speed along a longitudinal direction of the vehicle (the longitudinal direction can be a direction of the vehicle driving in a straight line), and the lateral speed can be a speed of the vehicle in a lateral direction (the lateral direction is perpendicular to the longitudinal direction). The third sensor 103 is configured for sensing a first yaw rate of the vehicle 10. The third sensor 103 may include an inertial measurement unit (IMU) or other sensors for sensing vehicle yaw rate.

For example, the vehicle 10 is provided with a pre-trained road condition recognition model, and the road condition recognition model can be trained by a convolutional neural network (CNN), or a recurrent neural network (RNN). The data processing module can call the road condition recognition model to determine the friction coefficient of road surface according to the road information sensed by the first sensor 101.

Figure 2:
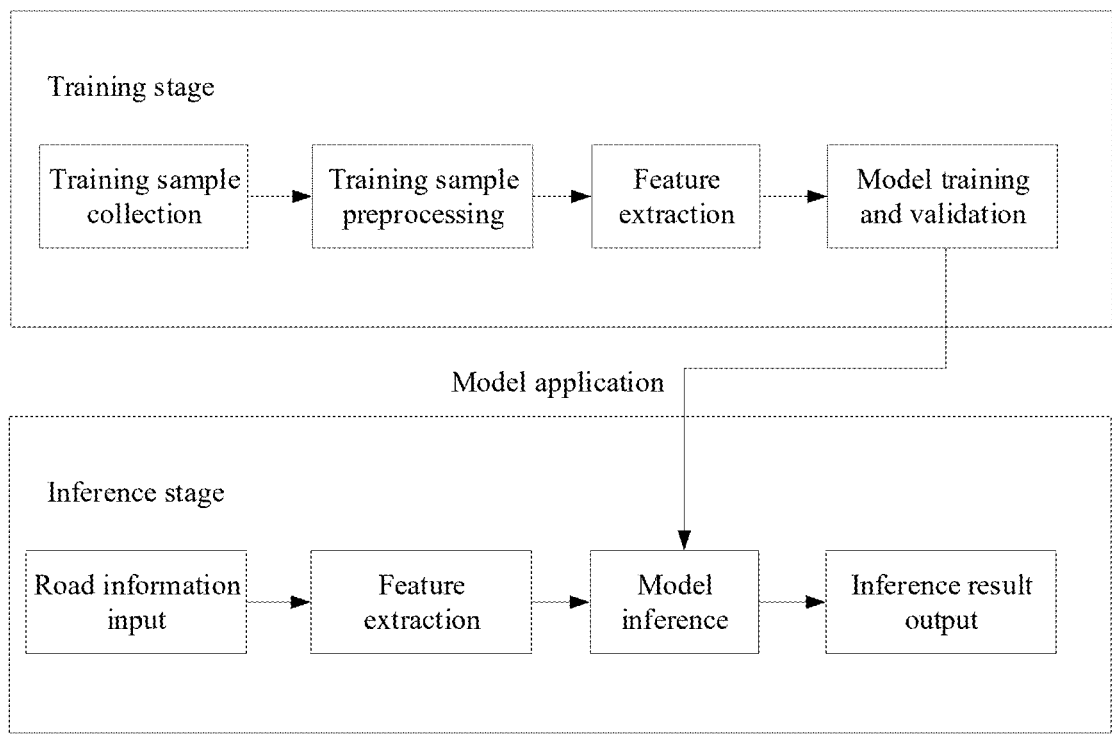
FIG. 2 is a block diagram illustrating a training stage and an inference stage of a road condition recognition model according to an embodiment of the present disclosure.

Referring to FIG. 2, the road condition recognition model can include a training stage and an inference stage. Taking the road condition recognition model being trained based on a preset CNN as an example, in the embodiment of the present application, the training stage may refer to a process in which a network training device uses training data to train the preset CNN to obtain the road condition recognition model, and the inference stage may refer to a process in which the vehicle uses the road condition recognition model to determine the friction coefficient of road surface corresponding to the road information. The network training device can be a computer, a server, a server cluster, or other devices, and the road condition recognition model trained by the network training device can be directly deployed to the vehicle 10, or deployed to the vehicle 10 after quantization processing.

In one embodiment, the training stage may include a training sample collection, a training sample preprocessing, a feature extraction, and a model training and validation. The training sample collection may refer to collect training samples including road images and road lidar data with different friction coefficients. The training sample preprocessing may refer to preprocess the collected training samples, so that the preprocessed training samples can be used for model training, and a manner of preprocessing can be set according to a model training requirement, and the embodiment of the application does not limit this. For example, the manner of preprocessing can include removing a part of training samples that do not meet a training requirement, adding labels to training samples that can be used to indicate the friction coefficient of road surface corresponding to the training samples, and so on. The feature extraction in the training stage may refer to extract features from the training samples for model training. For example, image features can be extracted from the road images, the image features may include edge features, texture features, and so on.

The model training and validation may refer to random divide the training samples into a training set and a validation set according to a preset proportion, iteratively train the preset CNN by using the training set, and verify an trained intermediate network by using the validation set. If the trained intermediate network is verified to meet a preset requirement, the trained intermediate network can be used as the road condition recognition model, and if the trained intermediate network does not meet the preset requirement, network parameters of the trained intermediate network can be adjusted, and the adjusted intermediate network can be re-trained and re-verified until the preset requirement is met.

In one embodiment, the labels can also be used to indicate road condition corresponding to the training samples, and different road conditions correspond to different friction coefficients of road surface. For example, the road conditions may include asphalt roads, cement roads, gravel roads, dirt roads, etc. Different roads can also be further subdivided according to a degree of wetness, whether snow exist in the road, whether icing exist in the road, etc., corresponding to different friction coefficients of road surface.

The inference stage may include a road information input, a feature extraction, a model inference, and an inference result output. The road information input can refer to sense the road information by the first sensor 101 during the vehicle 10 in a driving process, and input the road information sensed by the first sensor 101 to the road condition recognition model. The feature extraction in the inference stage may refer to extract features from the sensed road information for model inferring. The model inference may refer to use the road condition recognition model to identify and classify the extracted features, to obtain the friction coefficient of road surface corresponding to the sensed road information, or to obtain corresponding road condition. If the road condition is obtained, the road condition recognition model can further determine the friction coefficient of road surface corresponding to the road condition according to mapping relationships between preset road conditions and preset friction coefficients of road surface. The inference result output may refer to first vector information for indicating the friction coefficient of road surface corresponding to the road information, or refer to second vector information for indicating the road condition corresponding to the road information.

Figure 3:
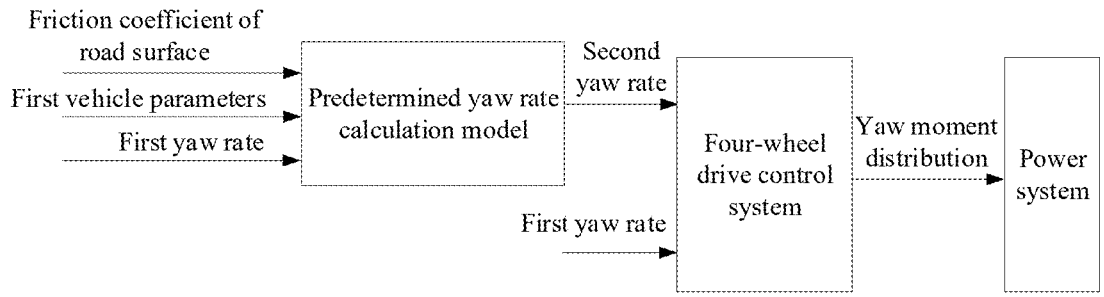
FIG. 3 is a flowchart illustrating a calculation and a distribution of a yaw moment of a vehicle according to an embodiment of the present disclosure.

Referring to FIG. 3, the data processing module in the vehicle 10 can also use a predetermined yaw rate calculation model to obtain a second yaw rate (also can be called ideal yaw rate) of the vehicle 10 based on pre-determined friction coefficient of road surface, the first vehicle parameters sensed by the second sensor 102, and the first yaw rate (also can be called actual yaw rate) sensed by the third sensor 103. A control system of the vehicle 10 can determine the yaw moment of the vehicle 10 according to a difference value between the first yaw rate and the second yaw rate, and distribute the yaw moment to a four-wheel driver, for coping with losing control and skidding of the vehicle 10. The four-wheel driver may include four independent drivers for driving wheels. For example, the vehicle 10 is an electric vehicle, and the four-wheel driver includes four independent motors for driving wheels.

In one embodiment, the control system of the vehicle 10 may include a four-wheel drive control system and a power system. The four-wheel drive control system is used for determining the yaw moment of the vehicle 10 based on the difference value between the first yaw rate and the second yaw rate, and distributing the yaw moment to the four-wheel driver of the power system. The four-wheel drive control system can also include one or more on-board control chips, such as ECUs to realize a four-wheel drive control function of the vehicle 10.

In one embodiment, the data processing module may also be a part of the four-wheel drive control system.

Figure 4:
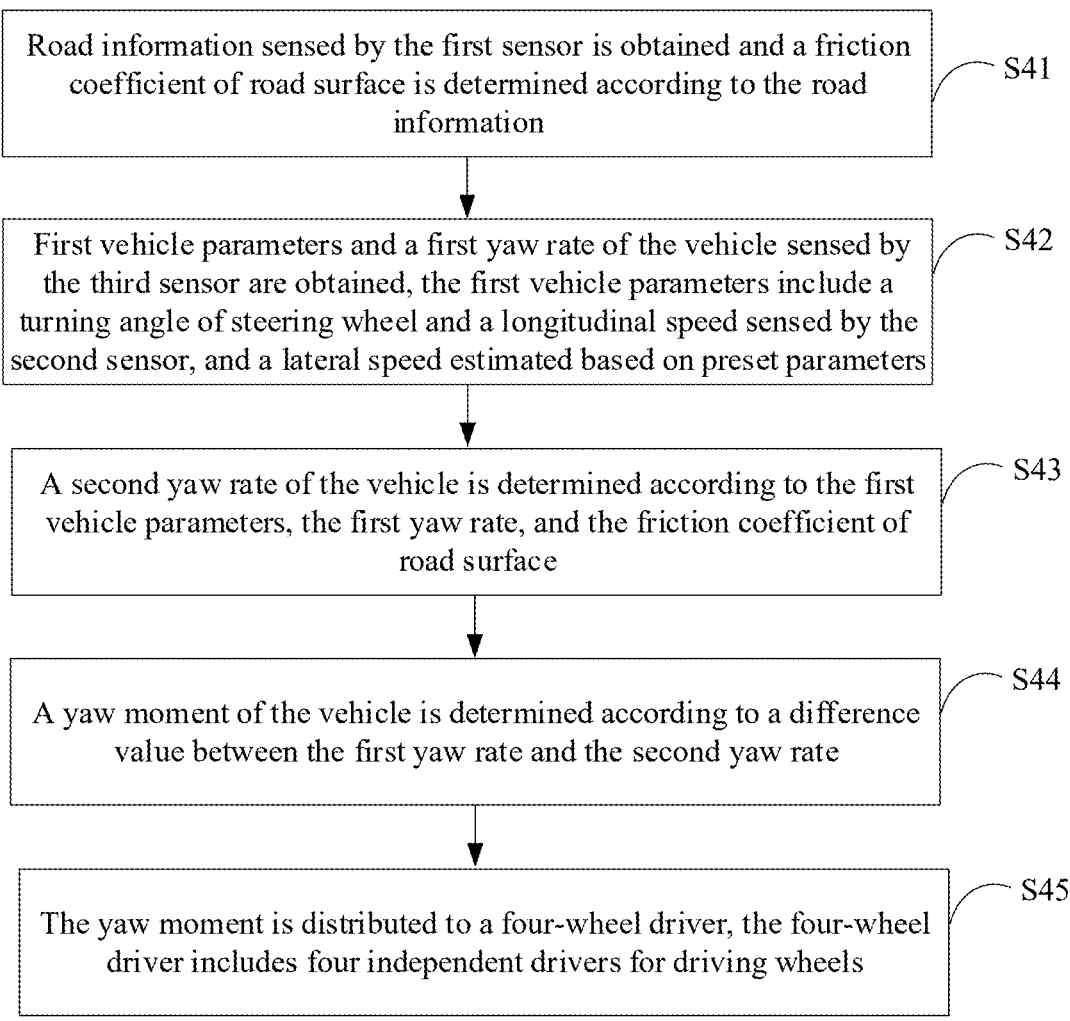
FIG. 4 is a flowchart illustrating the vehicle control method according to an embodiment of the present disclosure.

FIG. 4 illustrates one exemplary embodiment of a vehicle control method. The method can be applied to a vehicle as shown in FIG. 1. The vehicle includes a first sensor, a second sensor, and a third sensor. The flowchart presents an exemplary embodiment of the method. The exemplary method is provided by way of example, as there are a variety of ways to carry out the method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block S41.

In block S41, road information sensed by the first sensor is obtained and a friction coefficient of road surface is determined according to the road information.

In one embodiment, the first sensor may include cameras, lidars, etc., the cameras are used to collect road surface images, and the lidars are used to collect road relevant information, such as road surface unevenness, road surface slopes, etc. The friction coefficient of road surface can be determined based on information such as road surface images, road surface unevenness, and road surface slopes. For example, a road condition recognition model can be used to determine the friction coefficient of road surface corresponding to the road information sensed by the first sensor. The road condition recognition model can determine the friction coefficient of road surface corresponding to inputted road information, or determine the road condition corresponding to inputted road information, and further determine the friction coefficient of road surface corresponding to the inputted road information according to mapping relationships between preset road conditions and preset friction coefficients of road surface.

In one embodiment, the vehicle control method can be set to be executed after the vehicle is started or in a non-quiescent state, to save software and hardware resources of the vehicle.

In block S42, first vehicle parameters and a first yaw rate of the vehicle sensed by the third sensor are obtained, the first vehicle parameters include a turning angle of steering wheel and a longitudinal speed sensed by the second sensor, and a lateral speed estimated based on preset parameters.

In one embodiment, the first vehicle parameters include, but are not limited to, the turning angle of steering wheel, the longitudinal speed, the lateral speed, etc. The second sensor may include angle sensor, speed sensor, etc. The third sensor may be a sensor such as an IMU that can detect the yaw rate of the vehicle.

In one embodiment, the preset parameters may include a lateral acceleration, a yaw velocity, a longitudinal speed, and the lateral speed can be estimated based on the lateral acceleration, the yaw velocity, and the longitudinal speed. The lateral acceleration can be sensed by a transverse accelerometer, and the yaw velocity can be sensed by a yaw velocity sensor. The embodiment of the present application does not limit the calculation mode of the lateral speed, and the current calculation method can be used to estimate the lateral speed.

In block S43, a second yaw rate of the vehicle is determined according to the first vehicle parameters, the first yaw rate, and the friction coefficient of road surface.

In one embodiment, the first yaw rate can be an actual yaw rate detected by the third sensor when the vehicle is driven on a road, the second yaw rate can be an ideal yaw rate of the vehicle when the vehicle is driven on the road, and the second yaw rate can be calculated based on the first vehicle parameters, the first yaw rate, and the friction coefficient of road surface. For example, the first vehicle parameters, the first yaw rate, and the friction coefficient of road surface can be input into a yaw rate calculation model to obtain the second yaw rate.

Figure 5:
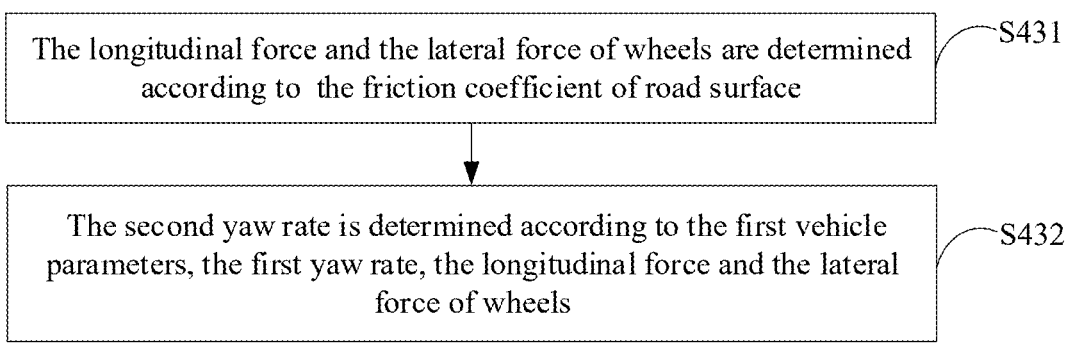
FIG. 5 is a sub-flowchart of a first block of the vehicle control method of FIG. 4 according to an embodiment of the present disclosure.

As shown in FIG. 5, in one embodiment, a longitudinal force and a lateral force of wheels of the vehicle can be determined based on the friction coefficient of road surface, and the longitudinal force and the lateral force of wheels can be used for calculating the second yaw rate. For example, determining the second yaw rate according to the first vehicle parameters, the first yaw rate, and the friction coefficient of road surface may include block S431 and block S432.

In block S431, the longitudinal force and the lateral force of wheels are determined according to the friction coefficient of road surface.

In block S432, the second yaw rate is determined according to the first vehicle parameters, the first yaw rate, the longitudinal force and the lateral force of wheels.

In one embodiment, the longitudinal force of wheels can be an average longitudinal force of all wheels of the vehicle, the lateral force of wheels can be an average lateral force of all wheels of the vehicle.

In one embodiment, after determining the friction coefficient of road surface, the longitudinal force and the lateral force of wheels can be determined based on a predetermined tire model. The predetermined tire model can be selected according to an actual requirement, and the embodiment of the present application is not limited to this. For example, the predetermined tire model is a magic formula tire model (MFT).

In one embodiment, a mathematical formula of the magic formula tire model inlcudes: $y=D*\sin[C*\arctan\{(1-E)*B*x+E*\arctan(B*x)\}]$, x is an input variable, y is an output variable, B is a tire stiffness factor, C is a tire shape factor, D is a peak value, E is a tire curvature factor, values of B and D can be set based on the friction coefficient of road surface. That is, different friction coefficients of road surface can correspond to different tire stiffness factors and different peak values, and mapping relationship between the values of B and D and the friction coefficient of road surface can be set according to the actual requirement, and the embodiment of the present application is not limited to this. For example, the mapping relationship between the values of B and D and the friction coefficient of road surface can be set according to tire types or vehicle parameters of the vehicle. Values of C and E can be pre-set based on tire parameters of the vehicle.

A mathematical formula of the longitudinal force of wheels includes: $F_{yf}=y(k)$, $F_{yf}$ is the longitudinal force of wheels, and k is a tire longitudinal slip ratio. That is, the tire longitudinal slip ratio is used as an input variable of the magic formula tire model, and an corresponding output value y is used as the longitudinal force of wheels.

A mathematical formula of the lateral force of wheels includes: $F_{yr}=y(\alpha)$, $F_{yr}$ is the lateral force of wheels, a is a tire slip angle. That is, the tire slip angle is used as an input variable of the magic formula tire model, and an corresponding output value y is used as the longitudinal lateral of wheels.

In one embodiment, the tire longitudinal slip ratio and the tire slip angle can be sensed based on relevant sensors installed on the vehicle, and the embodiment of the present application is not limit this.

In one embodiment, the vehicle 10 includes four wheels as an example, the longitudinal force of wheels may be an average value of longitudinal forces of the four wheels, the lateral force of wheels may be an average value of lateral forces of the four wheels.

In one embodiment, the longitudinal force of wheels may also be a maximum value among the longitudinal forces of the four wheels, the lateral force of wheels may also be a maximum value among the lateral forces of the four wheels.

Figure 6:
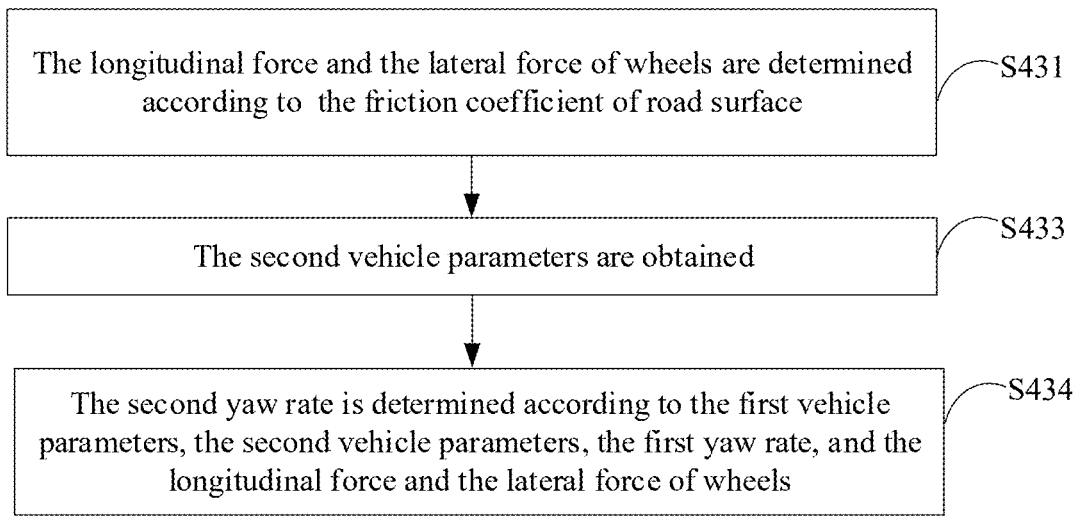
FIG. 6 is a sub-flowchart of the first block of the vehicle control method of FIG. 4 according to another embodiment of the present disclosure.

Referring to FIG. 6, in one embodiment, some yaw rate calculation models may use second vehicle parameters to calculate the second yaw rate. The second vehicle parameters may include a length from a barycenter of chassis to a front axle, a length from the barycenter of chassis to a rear axle, and a yaw inertia of the vehicle. For example, determining the second yaw rate according to the first vehicle parameters, the first yaw rate, and the friction coefficient of road surface may further include block S431, block S433, and block S434.

In block S431, the longitudinal force and the lateral force of wheels are determined according to the friction coefficient of road surface.

In block S433, the second vehicle parameters are obtained.

In block S434, the second yaw rate is determined according to the first vehicle parameters, the second vehicle parameters, the first yaw rate, and the longitudinal force and the lateral force of wheels.

For example, the first vehicle parameters, the second vehicle parameters, the first yaw rate, and the longitudinal force and the lateral force of wheels can be input into the yaw rate calculation model to obtain the second yaw rate.

In one embodiment, the yaw rate calculation model can be established based on a bicycle model. The bicycle model, also known as a single track model, is a general vehicle kinematics model that can be used to simulate motion states of the vehicle.

For example, the second yaw rate is calculated based on inputs of the first vehicle parameters, the second vehicle parameters, the first yaw rate, and the longitudinal force and the lateral force of wheels into the yaw rate calculation model, the yaw rate calculation model can be equivalent to the following mathematical formula: $\dot{r}=[(-F_{yf}*l_a+F_{yr}*l_b)*v-(F_{yf}*l_a^2+F_{yr}*l_b^2)*r]/(I*u)+(F_{yf}*l_a*\delta/I)$, $\dot{r}$ is the second yaw rate, r is the first yaw rate, $\delta$ is the turning angle of steering wheel, u is the longitudinal speed, v is the lateral speed, $F_{yf}$ is the longitudinal force of wheels, $F_{yr}$ is the lateral force of wheels, I is the yaw inertia of the vehicle, $l_a$ is the length from the barycenter of chassis to the front axle, $l_b$ is the length from the barycenter of chassis to the rear axle.

It can be understood that the equivalent mathematical formula of the yaw rate calculation model is only an example, and for a calculation of the second yaw rate using different parameter combinations, it is possible to set the yaw rate calculation model to be equivalent to different mathematical formulas.

In one embodiment, values of I, $l_a$, and $l_b$ can be measured before the vehicle leaves the factory and stored in the vehicle. For example, possible yaw scenarios can be simulated before the vehicle leaves the factory for a measurement of the yaw inertia of the vehicle.

In block S44, a yaw moment of the vehicle is determined according to a difference value between the first yaw rate and the second yaw rate.

In one embodiment, after obtaining the second yaw rate, the yaw moment of the vehicle can be determined based on the difference value between the first yaw rate and the second yaw rate.

In one embodiments, determining the yaw moment of the vehicle based on the difference value between the first yaw rate and the second yaw rate may include: obtaining a yaw inertia of the vehicle; determining the yaw moment of the vehicle according to the yaw inertia of the vehicle and the difference value between the first yaw rate and the second yaw rate.

For example, the difference value between the first yaw rate and the second yaw rate can be multiplied by the yaw inertia of the vehicle to obtain the yaw moment for coping with vehicle yaw.

In block S45, the yaw moment is distributed to a four-wheel driver, the four-wheel driver includes four independent drivers for driving wheels.

In one embodiment, after obtaining the yaw moment, the yaw moment can be independently distributed to the four drivers. For example, the yaw moment can be evenly distributed to four independent drivers.

In one embodiment, the yaw moment can also be distributed based on a longitudinal acceleration of the vehicle, the longitudinal acceleration of the vehicle indicates an event that the driver steps on an accelerator pedal or a brake pedal, and the yaw moment is distributed based on an acceleration behavior or a deceleration behavior of the driver, and the driving stability of the vehicle can be better guaranteed.

Figure 7:
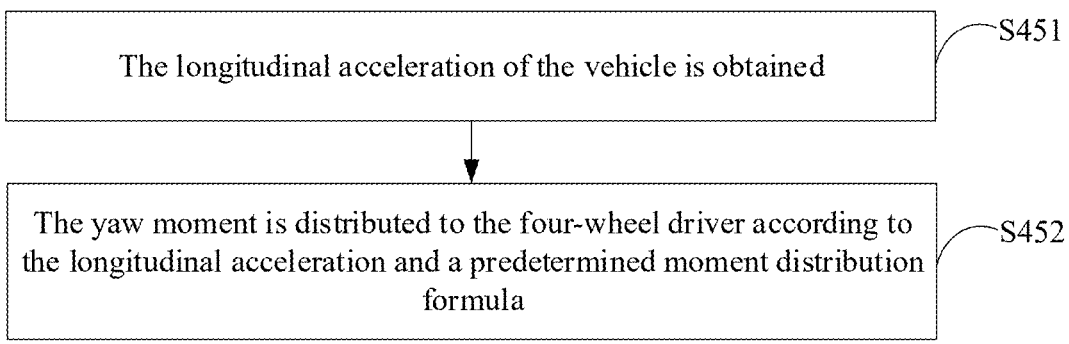
FIG. 7 is a sub-flowchart of a second block of the vehicle control method of FIG. 4 according to an embodiment of the present disclosure.

Referring to FIG. 7, distributing the yaw moment to the four-wheel driver may further include block S451 and block S452.

In block S451, the longitudinal acceleration of the vehicle is obtained.

In block S452, the yaw moment is distributed to the four-wheel driver according to the longitudinal acceleration and a predetermined moment distribution formula.

In one embodiment, the predetermined moment distribution formula is configured to distribute the yaw moment to the four-wheel driver. For example, the predetermined moment distribution formula includes: $T_{FL}=T_t/4-(\Delta M_z*r_{w1})/(4*l_{s1})$, $T_{FR}=T_t/4+(\Delta M_z*r_{w2})/(4*l_{s2})$, $T_{RL}=T_t/4-(\Delta M_z*r_{w3})/(4*l_{s3})$, $T_{RR}=T_t/4+(\Delta M_z*r_{w4})/(4*l_{s4})$, $T_{FL}$ is a moment distributed to a driver of left front wheel, $T_{FR}$ is a moment distributed to a driver of right front wheel, $T_{RL}$ is a moment distributed to a driver of left rear wheel, $T_{RR}$ is a moment distributed to a driver of right rear wheel, $T_t$ is a moment required for the longitudinal acceleration, $\Delta M_z$ is the yaw moment, $r_{w1}$ is a tire radius of left front wheel, $l_{s1}$ is a track of left front wheel, $r_{w2}$ is a tire radius of right front wheel, $l_{s2}$ is a track of right front wheel, $r_{w3}$ is a tire radius of left rear wheel, and $l_{s3}$ is a track of left rear wheel, $r_{w4}$ is a tire radius of right rear wheel, and $l_{s4}$ is a track of right rear wheel.

In one embodiment, tires of the vehicle have the same size and the same track, i.e. the values of $r_{w1}$, $r_{w2}$, $r_{w3}$, and $r_{w4}$ are the same, and the values of $l_{s1}$, $l_{s2}$, $l_{s3}$, and $l_{s4}$ are the same, the values of $r_{w1}$, $r_{w2}$, $r_{w3}$, $r_{w4}$, $l_{s1}$, $l_{s2}$, $l_{s3}$, and $l_{s4}$ can be measured and stored in the vehicle before leaving the factory.

The above-mentioned vehicle control method can determine the yaw moment based on the friction coefficient of road surface identified by the cameras and the lidars in real time, coping with losing control and skidding of the vehicle, and improving the driving safety of the vehicle. The yaw moment can be distributed to the four-wheel driver according to the longitudinal acceleration of the vehicle, keeping the vehicle stable, improving the steering safety of the vehicle, and the vehicle can adapt to different road conditions, and automatically adjust the moment distribution based on the friction coefficient of road surface corresponding to different road conditions, ensuring a driving performance and safety of the vehicle in different road conditions.

Figure 8:
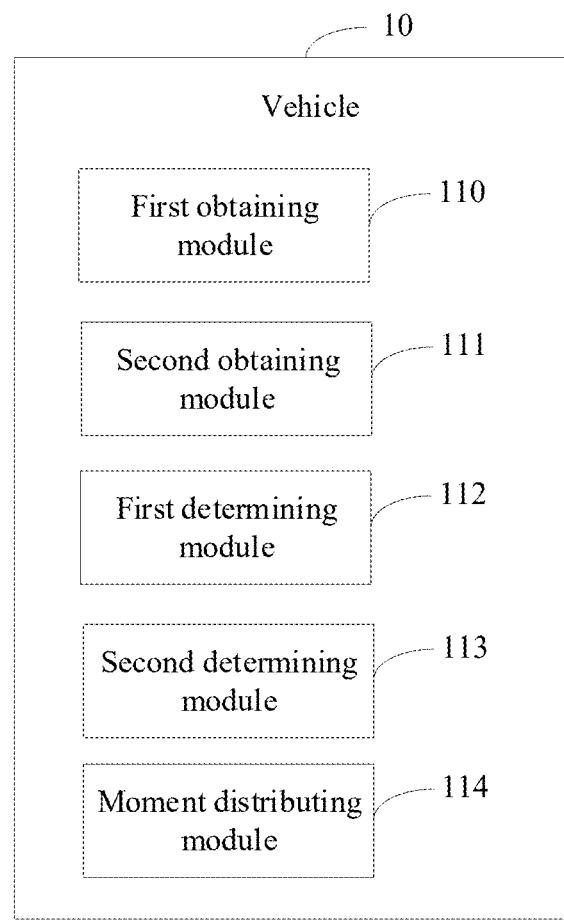
FIG. 8 is a block diagram illustrating the vehicle according to an embodiment of the present disclosure.

Referring to FIG. 8, the vehicle 10 may include a first obtaining module 110, a second obtaining module 111, a first determining module 112, a second determining module 113, and a moment distributing module 114. Each module may include one or more software programs in a form of computerized codes stored in a data storage. The computerized codes can include instructions that can be executed by a processor to implement the following function of each module. It can be understood that each module may also be a program instruction or a firmware solidified in the processor.

The first obtaining module 110 is configured to obtain road information sensed by a first sensor of the vehicle and determine a friction coefficient of road surface according to the road information.

The second obtaining module 111 is configured to obtain first vehicle parameters and a first yaw rate of the vehicle sensed by a third sensor of the vehicle. The first vehicle parameters include a turning angle of steering wheel and a longitudinal speed sensed by a second sensor of the vehicle, and a lateral speed estimated according to preset parameters.

The first determining module 112 is configured to determine a second yaw rate of the vehicle according to the first vehicle parameters, the first yaw rate, and the friction coefficient of road surface.

The second determining module 113 is configured to determine a yaw moment of the vehicle according to a difference value between the first yaw rate and the second yaw rate.

The moment distributing module 114 is configured to distribute the yaw moment to a four-wheel driver. The four-wheel driver includes four independent drives for driving wheels.

Figure 9:
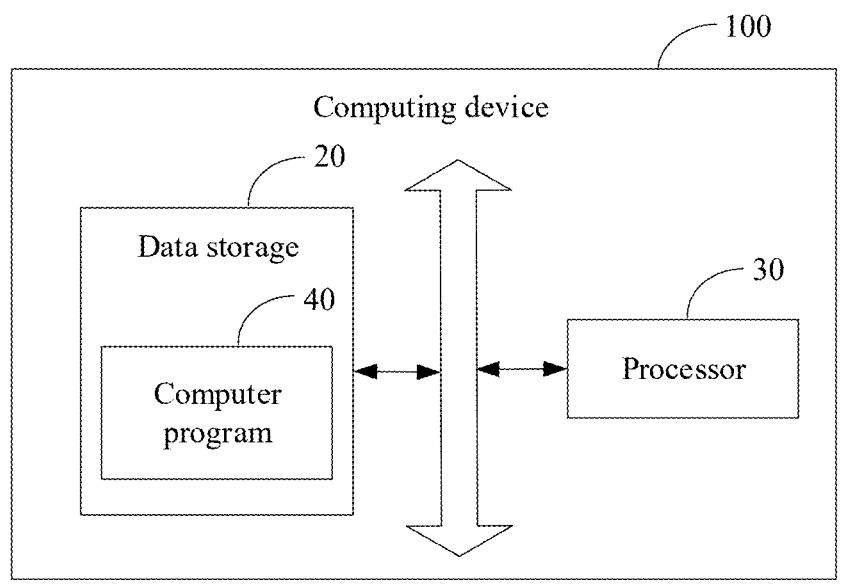
FIG. 9 is a hardware architecture diagram illustrating a computing device according to an embodiment of the present disclosure.

Referring to FIG. 9, a computing device 110 may include at least one data storage 20, at least one processor 30, and a computer program 40 that is stored in the data storage 20 and can be run on the processor 30. When the processor 30 executes the computer program 40, the vehicle control method can be realized in the vehicle, such as block S41 to block S45 shown in FIG. 4 can be executed.

In one embodiment, the computing device 100 can be integrated in the vehicle 10, that is, the computing device 100 can be a hardware module with data processing function in the vehicle 10.

In one embodiment, the computer program 40 be divided into one or more modules/units, and the one or more modules/units are stored in the data storage 20 and executed by processor 30. The module or units may be a series of computer instruction segments capable for completing a specific function, and the instruction segments are used for describing a execution process of the computer program 40 in the computing device 100.

In one embodiments, comparing with FIG. 9, the computing device 100 can include more or less elements, for example, the computing device 100 can further include input/output devices, network access devices, buses elements, etc.

In one embodiment, the processor 30 can be a central processing unit (CPU), a microprocessor, a digital signal processors (DSP), an application specific integrated circuit (ASIC), a field-programmable gate array (FPGA), or other data processor chip that achieves the required functions.

The data storage 20 can be used to store computer programs 40 and/or modules/units, and the processor 30 can realize various functions of the computing device 100 by running or executing computer programs and/or modules/units stored in the data storage 20 and calling up data stored in the data storage 20. The data storage 20 can be set in the computing device 100, or can be a separate external memory card, such as an SM card (Smart Media Card), an SD card (Secure Digital Card), or the like. The data storage 20 can include various types of non-transitory computer-readable storage mediums. For example, the data storage 20 can be an internal storage system, such as a flash memory, a random access memory (RAM) for the temporary storage of information, and/or a read-only memory (ROM) for permanent storage of information. The data storage 20 can also be an external storage system, such as a hard disk, a storage card, or a data storage medium.

The embodiment also provides a non-transitory storage medium, the non-transitory storage medium is configured to store computer instructions, and when the computer instructions are run on the computing device 100, causes the computing device 100 to perform the above-mentioned vehicle control method.

The embodiment also provides a computer program product, and when the computer program product is running on a computer device, the computer device is caused to perform the above-mentioned vehicle control method.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A vehicle control method applied to a four-wheel-drive vehicle, the four-wheel-drive vehicle comprising a first sensor, a second sensor, and a third sensor, the vehicle control method comprising:
   obtaining road information sensed by the first sensor and determining a friction coefficient of a road surface according to the road information;
   obtaining first vehicle parameters and a first yaw rate of the four-wheel-drive vehicle sensed by the third sensor, wherein the first vehicle parameters comprise a turning angle of a steering wheel and a longitudinal speed sensed by the second sensor, and a lateral speed estimated based on preset parameters;
   determining a second yaw rate of the four-wheel-drive vehicle according to the first vehicle parameters, the first yaw rate, and the friction coefficient of the road surface;
   determining a yaw moment of the four-wheel-drive vehicle according to a difference value between the first yaw rate and the second yaw rate; and
   distributing the yaw moment to a four-wheel driver, wherein the four-wheel driver comprises four independent drivers for driving wheels.

2. The vehicle control method of claim 1, wherein the first sensor comprises a camera and a lidar, determining the friction coefficient of the road surface according to the road information further comprises:
   inputting the road information to a road condition recognition model to obtain a road condition where the vehicle is traveling, wherein the road condition recognition model is trained by a plurality of road sample information on a preset convolutional neural network; and
   determining the friction coefficient of the road surface corresponding to the road condition according to mapping relationships between preset road conditions and preset friction coefficients of the road surface.

3. The vehicle control method of claim 1, wherein determining the second yaw rate of the four-wheel-drive vehicle according to the first vehicle parameters, the first yaw rate, and the friction coefficient of the road surface further comprises:
   determining a longitudinal force and a lateral force of wheels of the four-wheel-drive vehicle according to the friction coefficient of the road surface;
   obtaining second vehicle parameters of the four-wheel-drive vehicle, wherein the second vehicle parameters comprise a length from a barycenter of chassis to a front axle, a length from the barycenter of chassis to a rear axle, and a yaw inertia of the four-wheel-drive vehicle; and
   determining the second yaw rate according to the first vehicle parameters, the second vehicle parameters, the first yaw rate, and the longitudinal force and the lateral force of wheels.

4. The vehicle control method of claim 3, wherein determining the longitudinal force and the lateral force of wheels of the four-wheel-drive vehicle according to the friction coefficient of the road surface further comprises:
   determining the longitudinal force and the lateral force of wheels according to the friction coefficient of the road surface and a predetermined tire model;
   wherein the predetermined tire model applies a mathematical formula comprising: y=D*sin [C*arctan {(1−E)*B*x+E*arctan(B*x)}], wherein x is an input variable, y is an output variable, B is a tire stiffness factor, C is a tire shape factor, D is a peak value, E is a tire curvature factor, values of B and D are set based on the friction coefficient of the road surface,
   the longitudinal force of wheels is calculated according to a mathematical formula comprising: $F_{yf}=y(k)$, wherein $F_{yf}$ is the longitudinal force of wheels, and k is a tire longitudinal slip ratio, and the lateral force of wheels is calculated according to a mathematical formula comprising: $F_{yr}=y(\alpha)$, wherein $F_{yr}$ is the lateral force of wheels, α is a tire slip angle.

5. The vehicle control method of claim 4, wherein determining the second yaw rate according to the first vehicle parameters, the second vehicle parameters, the first yaw rate, and the longitudinal force and the lateral force of wheels further comprises:
   determining the second yaw rate according to the first vehicle parameters, the second vehicle parameters, the first yaw rate, the longitudinal force and the lateral force of wheels, and a predetermined yaw rate calculation model, wherein the predetermined yaw rate calculation model is established based on a bicycle model.

6. The vehicle control method of claim 5, wherein the predetermined yaw rate calculation model applies a following mathematical formula to calculate the second yaw rate:

$$[(-F_{yf}*l_a+F_{yr}*l_b)*v-(F_{yr}*l_a^2+F_{yr}*l_b^2)*r]/(I*u)+(F_{yr}*l_a*\delta/I),$$

wherein $\dot{r}$ is the second yaw rate, r is the first yaw rate, δ is the turning angle of the steering wheel, u is the longitudinal speed, v is the lateral speed, $F_{yf}$ is the longitudinal force of wheels, $F_{yr}$ is the lateral force of wheels, I is the yaw inertia of the four-wheel-drive vehicle, $l_a$ is the length from the barycenter of chassis to the front axle, $l_b$ is the length from the barycenter of chassis to the rear axle.

7. The vehicle control method of claim 1, wherein determining the yaw moment of the four-wheel-drive vehicle according to the difference value between the first yaw rate and the second yaw rate further comprises:
   obtaining a yaw inertia of the four-wheel-drive vehicle; and
   determining the yaw moment of the four-wheel-drive vehicle according to the yaw inertia of the four-wheel-drive vehicle and the difference value between the first yaw rate and the second yaw rate.

8. The vehicle control method of claim 7, wherein distributing the yaw moment to the four-wheel driver further comprises:
   obtaining a longitudinal acceleration of the four-wheel-drive vehicle; and
   distributing the yaw moment to the four-wheel driver according to the longitudinal acceleration and a predetermined moment distribution formula as follows:

$$T_{FL}=T_t/4-(\Delta M_z+r_{w1})/(4*l_{s1}),\ T_{FR}=T_t/4+(\Delta M_z+r_{w2})/(4*l_{s2}),\ T_{RL}=T_t/4-(\Delta M_z+r_{w3})/(4*l_{s3}),\ T_{RR}=T_t/4+(\Delta M_z*r_{w4})/(4*l_{s4}),\ \text{wherein:}$$

$T_{FL}$ is a moment distributed to a driver of a left front wheel of the wheels, $T_{FR}$ is a moment distributed to a driver of a right front wheel of the wheels, $T_{RL}$ is a moment distributed to a driver of a left rear wheel of the wheels, $T_{RR}$ is a moment distributed to a driver of a right rear wheel of the wheels, $T_t$ is a moment required for the longitudinal acceleration, $\Delta M_z$ is the yaw moment, $r_{w1}$ is a tire radius of the left front wheel, $l_{s1}$ is a track of the left front wheel, $r_{w2}$ is a tire radius of the right front wheel, $l_{s2}$ is a track of the right front wheel, $r_{w3}$ is a tire radius of the left rear wheel, and $l_{s3}$ is a track of the left rear wheel, $r_{w4}$ is a tire radius of the right rear wheel, and $l_{s4}$ is a track of the right rear wheel.

9. A computing device of a four-wheel-drive vehicle comprising:
   at least one processor; and
   a data storage storing one or more programs which when executed by the at least one processor, cause the at least one processor configured to:
      obtain road information sensed by a first sensor of the four-wheel-drive vehicle and determine a friction coefficient of a road surface according to the road information;
      obtain first vehicle parameters and a first yaw rate of the four-wheel-drive vehicle sensed by a third sensor of the four-wheel-drive vehicle, wherein the first vehicle parameters comprise a turning angle of a steering wheel and a longitudinal speed sensed by a second sensor of the four-wheel-drive vehicle, and a lateral speed estimated based on preset parameters;
      determine a second yaw rate of the four-wheel-drive vehicle according to the first vehicle parameters, the first yaw rate, and the friction coefficient of the road surface;
      determine a yaw moment of the four-wheel-drive vehicle according to a difference value between the first yaw rate and the second yaw rate; and
      distribute the yaw moment to a four-wheel driver, wherein the four-wheel driver comprises four independent drivers for driving wheels.

10. The computing device of claim 9, wherein the first sensor comprises a camera and a lidar, when the at least one processor determining the friction coefficient of the road surface according to the road information, the at least one processor is further configured to:
  input the road information to a road condition recognition model to obtain a road condition of vehicle driving, wherein the road condition recognition model is trained by a plurality of road sample information on a preset convolutional neural network; and
  determine the friction coefficient of the road surface corresponding to the road condition according to mapping relationships between preset road conditions and preset friction coefficients of the road surface.

11. The computing device of claim 9, wherein when the at least one processor determining the second yaw rate of the four-wheel-drive vehicle according to the first vehicle parameters, the first yaw rate, and the friction coefficient of the road surface, the at least one processor is further configured to:
  determine a longitudinal force and a lateral force of wheels of the four-wheel-drive vehicle according to the friction coefficient of the road surface;
  obtain second vehicle parameters of the four-wheel-drive vehicle, wherein the second vehicle parameters comprise a length from a barycenter of chassis to a front axle, a length from the barycenter of chassis to a rear axle, and a yaw inertia of the four-wheel-drive vehicle; and
  determine the second yaw rate according to the first vehicle parameters, the second vehicle parameters, the first yaw rate, and the longitudinal force and the lateral force of wheels.

12. The computing device of claim 11, wherein when the at least one processor determining the second yaw rate of the four-wheel-drive vehicle according to the first vehicle parameters, the first yaw rate, and the friction coefficient of the road surface, the at least one processor is further configured to:
  determine the longitudinal force and the lateral force of wheels according to the friction coefficient of the road surface and a predetermined tire model;
  wherein the predetermined tire model applies a mathematical formula comprising: y=D*sin [C*arctan {(1−E)*B*x+E*arctan(B*x)}], wherein x is an input variable, y is an output variable, B is a tire stiffness factor, C is a tire shape factor, D is a peak value, E is a tire curvature factor, values of B and D are set based on the friction coefficient of the road surface,
  the longitudinal force of wheels is calculated according to a mathematical formula comprising: $F_{yf}$=y(k), wherein $F_{yr}$ is the longitudinal force of wheels, and k is a tire longitudinal slip ratio, and
  the lateral force of wheels is calculated according to a mathematical formula comprising: $F_{yr}$=y(α), wherein $F_{yr}$ is the lateral force of wheels, a is a tire slip angle.

13. The computing device of claim 12, wherein when the at least one processor determining the second yaw rate according to the first vehicle parameters, the second vehicle parameters, the first yaw rate, and the longitudinal force and the lateral force of wheels, the at least one processor is further configured to:
  determine the second yaw rate according to the first vehicle parameters, the second vehicle parameters, the first yaw rate, the longitudinal force and the lateral force of wheels, and a predetermined yaw rate calculation model, wherein the predetermined yaw rate calculation model is established based on a bicycle model.

14. The computing device of claim 13, wherein the predetermined yaw rate calculation model applies a following mathematical formula to calculate the second yaw rate:

$$\dot{r}=[(-F_{yf}*l_a+F_{yr}*l_b)*v-(F_{yr}*l_a^2+F_{yr}*l_b^2)*r]/(I*u)+(F_{yr}*l_a*\delta/I),$$

wherein $\dot{r}$ is the second yaw rate, r is the first yaw rate, δ is the turning angle of the steering wheel, u is the longitudinal speed, v is the lateral speed, $F_{yr}$ is the longitudinal force of wheels, $F_{yr}$ is the lateral force of wheels, I is the yaw inertia of the four-wheel-drive vehicle, $l_a$ is the length from the barycenter of chassis to the front axle, $l_b$ is the length from the barycenter of chassis to the rear axle.

15. The computing device of claim 9, wherein when the least one processor determining the yaw moment of the four-wheel-drive vehicle according to the difference value between the first yaw rate and the second yaw rate, the least one processor is further configured to:
  obtain a yaw inertia of the four-wheel-drive vehicle; and
  determine the yaw moment of the four-wheel-drive vehicle according to the yaw inertia of the four-wheel-drive vehicle and the difference value between the first yaw rate and the second yaw rate.

16. The computing device of claim 15, wherein when the least one processor distributing the yaw moment to the four-wheel driver, the least one processor is further configured to:
  obtain a longitudinal acceleration of the four-wheel-drive vehicle; and
  distribute the yaw moment to the four-wheel driver according to the longitudinal acceleration and a predetermined moment distribution formula;
  wherein the predetermined moment distribution formula comprises:

$$T_{FL}=T_t/4-(\Delta M_z*r_{w1})/(4*l_{s1}),\ T_{FR}=T_t/4+(\Delta M_z*r_{w2})/(4*l_{s2}),\ T_{RL}=T_t/4-(\Delta M_z*r_{w3})/(4*l_{s3}),\ T_{RR}=T_t/4+(\Delta M_z*r_{w4})/(4*l_{s4}),$$

wherein $T_{FL}$ is a moment distributed to a driver of a left front wheel of the wheels, $T_{FR}$ is a moment distributed to a driver of a right front wheel of the wheels, $T_{RL}$ is a moment distributed to a driver of a left rear wheel of the wheels, $T_{RR}$ is a moment distributed to a driver of a right rear wheel of the wheels, $T_t$ is a moment required for the longitudinal acceleration, $\Delta M_z$ is the yaw moment, $r_{w1}$ is a tire radius of the left front wheel, $l_{s1}$ is a track of the left front wheel, $r_{w2}$ is a tire radius of the right front wheel, $l_{s2}$ is a track of the right front wheel, $r_{w3}$ is a tire radius of the left rear wheel, and $l_{s3}$ is a track of the left rear wheel, $r_{w4}$ is a tire radius of the right rear wheel, and $l_{s4}$ is a track of the right rear wheel.

17. A non-transitory storage medium having stored thereon instructions that, when executed by a processor of a four-wheel-drive vehicle, causes the four-wheel-drive vehicle to perform a vehicle control method, the vehicle control method comprising:
  obtaining road information sensed by a first sensor of the four-wheel-drive vehicle and determining a friction coefficient of a road surface according to the road information;
  obtaining first vehicle parameters and a first yaw rate of the four-wheel-drive vehicle sensed by a third sensor of the four-wheel-drive vehicle, wherein the first vehicle parameters comprise a turning angle of a steering wheel and a longitudinal speed sensed by a second sensor of the four-wheel-drive vehicle, and a lateral speed estimated based on preset parameters;

determining a second yaw rate of the four-wheel-drive vehicle according to the first vehicle parameters, the first yaw rate, and the friction coefficient of the road surface;

determining a yaw moment of the four-wheel-drive vehicle according to a difference value between the first yaw rate and the second yaw rate; and distributing the yaw moment to a four-wheel driver, wherein the four-wheel driver comprises four independent drivers for driving wheels.

\* \* \* \* \*